US012775634B2

(12) United States Patent
Shankar et al.

(10) Patent No.: US 12,775,634 B2
(45) Date of Patent: Oct. 27, 2026

(54) DATABASE SYSTEMS AND PARALLEL PROCESSING METHODS WITH RELATIONSHIP CHUNKING

(71) Applicant: Salesforce, Inc., San Francisco, CA (US)

(72) Inventors: Ravi Shankar, Hyderabad (IN); Gopala Sarma Akshintala, Hyderabad (IN); Atul Kumar, Hyderabad (IN); Shivanshu Goyal, Bangalore (IN); Anshul Rawat, Hyderabad (IN)

(73) Assignee: Salesforce, Inc.

( * ) Notice: Subject to any disclaimer, the term of this patent is extended or adjusted under 35 U.S.C. 154(b) by 671 days.

(21) Appl. No.: 18/157,471

(22) Filed: Jan. 20, 2023

(65) Prior Publication Data

US 2024/0248913 A1 Jul. 25, 2024

(51) Int. Cl.

| | |
|---|---|
| ***G06F 16/27*** | (2019.01) |
| ***G06F 9/46*** | (2006.01) |
| ***G06F 16/23*** | (2019.01) |
| ***G06F 16/28*** | (2019.01) |

(52) U.S. Cl.

CPC ............ *G06F 16/278* (2019.01); *G06F 9/466* (2013.01); *G06F 16/2343* (2019.01); *G06F 16/285* (2019.01)

(58) Field of Classification Search

None

See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |

(Continued)

*Primary Examiner* — Craig C Dorais

(74) *Attorney, Agent, or Firm* — Ingrassia Fisher & Lorenz, LLP

(57) ABSTRACT

Database systems and methods are provided for parallel processing heterogenous jobs at a database system. One method involves identifying database records corresponding to a batch of jobs and identifying, for the respective jobs, a respective set of related database records associated with the respective job based on a respective value for a metadata field of the respective database record corresponding to the respective job. The metadata field value uniquely identifies the respective set of related database records associated with the respective database record. The method divides the batch of jobs into chunks based on the respective sets of related database records associated with the respective jobs. Each chunk includes a respective subset of the batch of jobs having an aggregate workload based on the respective sets of related database records associated with the respective jobs of the respective chunk that is less than a chunking threshold.

20 Claims, 6 Drawing Sheets

(56) References Cited

U.S. PATENT DOCUMENTS

| | | | |
|---|---|---|---|
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,069,231 | B1 | 6/2006 | Cinarkaya et al. |
| 7,181,758 | B1 | 2/2007 | Chan |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,401,094 | B1 | 7/2008 | Kesler |
| 7,412,455 | B2 | 8/2008 | Dillon |
| 7,508,789 | B2 | 3/2009 | Chan |
| 7,620,655 | B2 | 11/2009 | Larsson et al. |
| 7,698,160 | B2 | 4/2010 | Beaven et al. |
| 7,730,478 | B2 | 6/2010 | Weissman |
| 7,779,475 | B2 | 8/2010 | Jakobson et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,209,308 | B2 | 6/2012 | Rueben et al. |
| 8,275,836 | B2 | 9/2012 | Beaven et al. |
| 8,457,545 | B2 | 6/2013 | Chan |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,045 | B2 | 8/2013 | Rueben et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 11,061,734 | B2 | 7/2021 | Ke et al. |
| 11,113,667 | B1 * | 9/2021 | Jiang .................. H04L 12/1822 |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramanian et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2006/0021019 | A1 | 1/2006 | Hinton et al. |
| 2008/0249972 | A1 | 10/2008 | Dillon |
| 2009/0063414 | A1 | 3/2009 | White et al. |
| 2009/0100342 | A1 | 4/2009 | Jakobson |
| 2009/0177744 | A1 | 7/2009 | Marlow et al. |
| 2011/0247051 | A1 | 10/2011 | Bulumulla et al. |
| 2012/0042218 | A1 | 2/2012 | Cinarkaya et al. |
| 2012/0218958 | A1 | 8/2012 | Rangaiah |
| 2012/0233137 | A1 | 9/2012 | Jakobson et al. |
| 2013/0212497 | A1 | 8/2013 | Zelenko et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2013/0247216 | A1 | 9/2013 | Cinarkaya et al. |
| 2023/0100107 | A1 * | 3/2023 | Hinch .................. G06F 16/287 702/186 |
| 2025/0058892 | A1 * | 2/2025 | Lopez Sandoval ...... G08G 5/76 |

* cited by examiner

| Record Relationship | Number of related A database records | Number of related B database records | Number of related C database records |
|---|---|---|---|
| RelationshipID1 | 1 | 6 | 8 |
| RelationshipID2 | 1 | 1 | 3 |
| RelationshipID3 | 1 | 5 | 14 |
| RelationshipID4 | 1 | 9 | 2 |
| RelationshipID5 | 1 | 3 | 0 |

FIG. 4

DATABASE SYSTEMS AND PARALLEL PROCESSING METHODS WITH RELATIONSHIP CHUNKING

TECHNICAL FIELD

One or more implementations relate to the field of database systems, and more specifically, to a database system that supports parallel processing of heterogeneous work.

BACKGROUND

Modern software development has evolved towards web applications or cloud-based applications that provide access to data and services via the Internet or other networks. For example, social media platforms and other collaborative web sites allow users to exchange direct messages or form groups for broadcasting messages and collaborating with one another. In business environments and customer relationship management (CRM) contexts, communication platforms facilitate users sharing information about sales opportunities or other issues surrounding products or services and track changes to projects and sales opportunities by receiving broadcast updates about coworkers, files, and other project related data objects.

In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. Multi-tenant cloud-based architectures have been developed to support multiple user groups (also referred to as "organizations" or "tenants") using a common hardware and software platform. Some multi-tenant database systems include an application platform that supports a customizable user experience, for example, to create custom applications, web pages, reports, tables, functions, and/or other objects or features.

In a CRM setting or other business context, various software tools exist to aid organizations with managing interactions with customers and potential customers. These tools, however, rely on vast amounts of data that often results in unique data processing challenges to achieve efficient use of resources while processing data as part of a data stream. Parallel computing (or parallelization) is often employed to process large data sets in parallel by dividing and distributing data so that different processing threads can process different subsets of work in accordance with resource availability. However, in some scenarios, a unit of work may be heterogenous and include one or more related sub-tasks of varying complexity, where the execution of those sub-tasks may be conditional (and may not occur) and/or involve atomic transactions, such that dividing and distributing based on units of work can produce an uneven distribution of work (due to the heterogeneity of the sub-tasks), while dividing and distributing on the basis of sub-tasks could result in partial processing, failure of atomic transactions, or undesirable data corruption. Accordingly, it is desirable to provide a balanced distribution of heterogenous work for parallel processing while maintaining atomicity and data integrity.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 4 is a table of record relationships and corresponding database record types that may be associated with different heterogenous jobs in connection with the chunking process of FIG. 2 according to some exemplary implementations;

DETAILED DESCRIPTION

Figure 1:
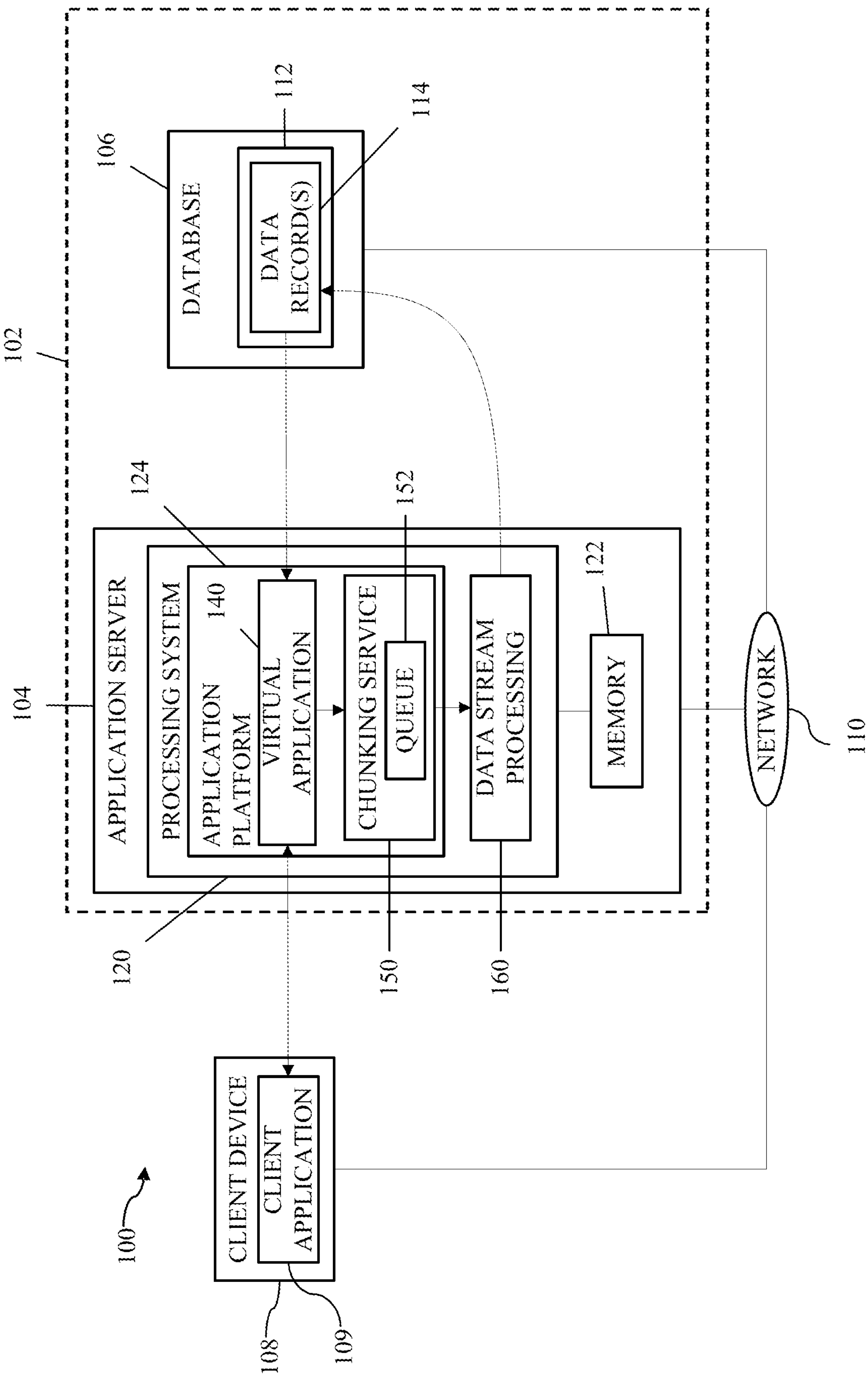
FIG. 1 is a block diagram illustrating a computing system that supports customizable automated invoice generation according to some exemplary implementations.

The following description describes implementations for chunking and allocating records for parallel processing using record relationships to ensure related records associated with a particular job are all locked and/or updated together as part of the same processing transaction rather than separate transactions, which could lead to data errors, mismatches between records, or otherwise inhibit atomicity. As described in greater detail below, a job is associated with a particular database record (alternatively referred to herein for purposes of explanation as the primary database record), where the execution of the job may involve one or more sub-tasks that involve one or more different database records related to the primary database record associated with the job. For example, a job associated with a task of generating an invoice based on a billing schedule database record associated with an order record may include sub-tasks that include updating a status field of the billing schedule database record (e.g., from ReadyForInvoicing to Processing), creating child billing period transaction records corresponding to the billable event(s) associated with the order record, and creating corresponding invoice lines corresponding to the billing period transaction records, and correspondingly updating the invoice record(s) associated with that billing schedule. In this regard, the invoice generation job represents heterogeneous work that involves multiple different sub-tasks with respect to different types of related database records, where the amount and complexity of work associated with the job may vary depending on the particular record that is the subject of the job.

In exemplary implementations described herein, record relationship metadata associated with the primary database record associated with a job is utilized to chunk and allocate jobs (and corresponding database records) for parallel processing rather than chunking and allocating based on a primary key. For example, a relationship identification field is added to database records and utilized to track the relationship of database records across different types of database records. In one implementation, the relationship identification field value is set to a unique identifier associated with a parent task database record associated with a particular job. In other implementations, the relationship identification field may be realized as a composite field having a value determined based on the subset of related database records that is capable of uniquely identifying the related database records.

As described in greater detail below, the record relationship metadata is utilized to identify the associated number of related database records that are associated with a respective job that has been queued for parallel processing, where the queued batch of jobs are divided into different mutually exclusive chunks (or subsets) based on the associated number of related database records associated with the respective jobs. In this manner, the number of jobs allocated to the different chunks may vary while the cumulative number of related database records associated with each chunk may be maintained substantially balanced across the different chunks to achieve a substantially balanced distribution of work or processing load across chunks. Moreover, by allocating related database records to the same chunk in a mutually exclusive manner, no related database records should be the subject of jobs or sub-tasks allocated to a different chunk, thereby maintaining atomicity and data integrity such that success or failure of any kind of processing associated with or within one chunk does not affect related records allocated to a different chunk.

In exemplary implementations, the number of related database records associated with a particular job are utilized to calculate or otherwise determine an estimated workload score associated with the respective job, which in turn, may be utilized to divide jobs into different chunks such that the aggregate workload score associated with the jobs assigned to any chunk is less than or equal to a chunking threshold utilized to divide the jobs into chunks. In this regard, the estimated workload score associated with the respective job may be calculated or otherwise determined as a weighted sum or using another equation that assigns different weighting factors to different types of database records associated with the respective job. For example, different types of database records may be assigned a greater or lesser weighting factor commensurate with the anticipated processing load or computing resources associated with the respective type of database records, such that the estimated workload score represents the estimated or anticipated amount of computing resources associated with the respective job based on the different number and types of related database records associated with the job. In this manner, the subject matter described herein provides means for chunking a large set of heterogeneous related data within jobs to facilitate parallel processing in a manner that distributes heterogeneous, composite units of work across different processing units while maintaining the integrity of the relationships between the database records associated with the respective jobs.

FIG. 1 depicts an exemplary computing system 100 capable of supporting chunking jobs for parallel processing based on the associated number of related records maintained at a database system 102. It should be appreciated that FIG. 1 is a simplified representation of a computing system 100 and is not intended to be limiting. In the illustrated implementation, the database system 102 includes one or more servers 104 that users of client devices 108 may interact with, over a communications network 110 (e.g., the Internet or any sort or combination of wired and/or wireless computer network, a cellular network, a mobile broadband network, a radio network, or the like), to view, access or obtain data or other information from one or more data records 114 at a database 106 or other repository associated with the database system 102.

In one or more exemplary implementations, the database system 102 includes one or more application servers 104 that support an application platform 124 capable of providing instances of virtual applications 140, over the network 110, to any number of client devices 108 that users may interact with to obtain data or other information from one or more data records 114 maintained in one or more data tables 112 at the database 106 associated with the database system 102. For example, the database 106 may maintain, on behalf of a user, tenant, organization or other resource owner, data records 114 entered or created by that resource owner (or users associated therewith), files, objects or other records uploaded by the resource owner (or users associated therewith), and/or files, objects or other records automatically generated by one or more computing processes (e.g., by the server 104 based on user input or other records or files stored in the database 106). In this regard, in one or more implementations, the database system 102 is realized as an on-demand multi-tenant database system that is capable of dynamically creating and supporting virtual applications 140 based upon data from a common database 106 that is shared between multiple tenants, which may alternatively be referred to herein as a multi-tenant database. Data and services generated by the virtual applications 140 may be provided via the network 110 to any number of client devices, as desired, where instances of the virtual application may be suitably generated at run-time (or on-demand) using a common application platform 124 that securely provides access to the data in the database 106 for each of the various tenants subscribing to the multi-tenant system.

The application server 104 generally represents the one or more server computing devices, server computing systems or other combination of processing logic, circuitry, hardware, and/or other components configured to support remote access to data records maintained in the data tables 112 at the database 106 via the network 110. Although not illustrated in FIG. 1, in practice, the database system 102 may include any number of application servers 104 in concert with a load balancer that manages the distribution of network traffic across different servers 104 of the database system 102.

In exemplary implementations, the application server 104 generally includes at least one processing system 120, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the application server 104 may also include one or more communications interfaces, which include any number of transmitters, receiver, transceivers, wired network interface controllers (e.g., an Ethernet adapter), wireless adapters or another suitable network interface that supports communications to/from the network 110 coupled thereto. The application server 104 also includes or otherwise accesses a data storage element 122 (or memory), and depending on the implementation, the memory 122 may be realized as a random access memory (RAM), read only memory (ROM), flash memory, magnetic or optical mass storage, or any other suitable non-transitory short or long term data storage or other computer-readable media, and/or any suitable combination thereof. In exemplary implementations, the memory 122 stores code or other computer-executable programming instructions that, when executed by the processing system 120, are configurable to cause the processing system 120 to support or otherwise facilitate the application platform 124 and related software services 150, 160 that are configurable to subject matter described herein.

The client device 108 generally represents an electronic device coupled to the network 110 that may be utilized by a user to access an instance of the virtual application 140 using an application 109 executing on or at the client device 108. In practice, the client device 108 can be realized as any sort of personal computer, mobile telephone, tablet or other network-enabled electronic device coupled to the network 110 that executes or otherwise supports a web browser or other client application 109 that allows a user to access one or more GUI displays provided by the virtual application 140. In exemplary implementations, the client device 108 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 108. The illustrated client device 108 executes or otherwise supports a client application 109 that communicates with the application platform 124 provided by the processing system 120 at the application server 104 to access an instance of the virtual application 140 using a networking protocol. In some implementations, the client application 109 is realized as a web browser or similar local client application executed by the client device 108 that contacts the application platform 124 at the application server 104 using a networking protocol, such as the hypertext transport protocol (HTTP). In this manner, in one or more implementations, the client application 109 may be utilized to access or otherwise initiate an instance of a virtual application 140 hosted by the database system 102, where the virtual application 140 provides one or more web page GUI displays within the client application 109 that include GUI elements for interfacing and/or interacting with records 114 maintained at the database 106.

In exemplary embodiments, the database 106 stores or otherwise maintains data for integration with or invocation by a virtual application 140 in objects organized in object tables 112. In this regard, the database 106 may include any number of different object tables 112 configured to store or otherwise maintain alphanumeric values or other descriptive information that define a particular instance of a respective type of object associated with a respective object table 112. For example, the virtual application may support a number of different types of objects that may be incorporated into or otherwise depicted or manipulated by the virtual application, with each different type of object having a corresponding object table 112 that includes columns or fields corresponding to the different parameters or criteria that define a particular instance of that object. In some implementations, the database 106 stores or otherwise maintains application objects (e.g., an application object type) where the application object table 112 includes columns or fields corresponding to the different parameters or criteria that define a particular virtual application 140 capable of being generated or otherwise provided by the application platform 124 on a client device 108. In this regard, the database 106 may also store or maintain graphical user interface (GUI) objects that may be associated with or referenced by a particular application object and include columns or fields that define the layout, sequencing, and other characteristics of GUI displays to be presented by the application platform 124 on a client device 108 in conjunction with that application 140.

In exemplary implementations, the database 106 stores or otherwise maintains additional database objects for association and/or integration with a virtual application 140, which may include custom objects and/or standard objects. For example, an administrator user associated with a particular resource owner may utilize an instance of a virtual application 140 to create or otherwise define a new custom field to be added to or associated with a standard object, or define a new custom object type that includes one or more new custom fields associated therewith. In this regard, the database 106 may also store or otherwise maintain metadata that defines or describes the fields, process flows, workflows, formulas, business logic, structure and other database components or constructs that may be associated with a particular application database object. In various implementations, the database 106 may also store or otherwise maintain validation rules providing validation criteria for one or more fields (or columns) of a particular database object type, such as, minimum and/or maximum values for a particular field, a range of allowable values for the particular field, a set of allowable values for a particular field, or the like, along with workflow rules or logical criteria associated with respective types of database object types that define actions, triggers, or other logical criteria or operations that may be performed or otherwise applied to entries in the various database object tables 112 (e.g., in response to creation, changes, or updates to a record in an object table 112).

In exemplary implementations, the application platform 124 includes or otherwise supports a chunking service 150 that is configurable to interact with instances of the virtual application 140 to obtain batches of jobs that were instantiated, initiated or otherwise created by the application platform 124 and/or the virtual application 140 that correspond to one or more create, read, update, or delete (CRUD) operations to be performed with respect to one or more database records 114 in connection with instances of the virtual application 140. In this regard, a user may interact with an instance of a virtual application 140 to create, edit, update or delete a database record 114 or manually trigger or otherwise initiate a particular process or workflow associated with the virtual application 140. In some implementations, an instance of the virtual application 140 may automatically trigger or otherwise initiate a particular process or workflow when one or more triggering criteria for automated execution of the particular process or workflow associated with the virtual application 140 are satisfied. In response to user interaction or other automated action, the virtual application 140 may generate or otherwise create a corresponding job to be performed to effectuate that particular database transaction, CRUD operation, process, workflow or the like and provide the job to the chunking service 150 for execution. For example, in one implementation, the application platform 124 and/or the virtual application 140 may create a job record (or file) that maintains code, data or other information for performing one or more tasks (or sub-tasks) associated with the job for the respective process, workflow or database transaction and includes a relationship identification field or other metadata fields identifying the primary database record 114 associated with the respective primary task(s) for the job along with related database records 114 associated with the primary database record 114 that may be the subject of one or more sub-tasks associated with the job, as described in greater detail below. In this regard, in some implementations, the data tables 112 and database records 114 in the database 106 may include a record relationship identification field or column of metadata that uniquely identifies related sets of database records 114 that may have parent-child relationships or other types of record relationships with respect to one another.

As described in greater detail below, the chunking service 150 analyzes the batch of jobs provided by the virtual application(s) 140 and divides or otherwise allocates the jobs into different mutually exclusive subsets (or chunks) for subsequent processing by a data stream processing service 160. After assigning or allocating a subset of jobs to a particular chunk, the chunking service 150 generates or otherwise creates a corresponding message maintained in a message queue 152 accessible to the data stream processing service 160. In exemplary implementations, the chunking service 150 utilizes the relationship identification field or other relationship metadata associated with the jobs provided by the virtual application(s) 140 to identify a corresponding set of database records 114 for a job, and based thereon, identify the respective number of related database records associated with the respective jobs in the batch. The associated number of related database records may be utilized by the chunking service 150 to divide or otherwise allocate the jobs into mutually exclusive chunks, where the respective subset of jobs associated with a respective chunk results in an estimated aggregate workload for the chunk that is less than or equal to a chunking threshold that is configurable to substantially balance workload across the chunks.

In some implementations, the chunking threshold may be realized as a threshold number of record relationships, where the aggregate number of record relationships associated with the jobs allocated to a particular chunk is maintained at or below the threshold number of relationships, such that no more than the chunking threshold number of record relationships (or sets of related database records) are assigned to a respective chunk. In other implementations, the chunking threshold may be realized as a threshold number of related records, where the aggregate number of related records associated with the jobs allocated to a particular chunk is maintained at or below the threshold number of related records, such that the total number of database records potentially involved in execution of the subset of jobs belonging to a particular chunk is substantially equal across the chunks and maintained below a threshold. In such scenarios, jobs having fewer numbers of related database records associated therewith may be grouped together into chunks up to reaching the chunking threshold, resulting in chunks with a greater number of jobs per chunk while maintaining the total number of related database records per chunk less than or equal to the chunking threshold, while jobs having a higher numbers of related database records may result in chunks with a lower number of jobs per chunk while maintaining the total number of related database records substantially equal to other chunks (e.g., a total number of related database records per chunk less than or equal to the chunking threshold). That said, in other implementations, the chunking threshold may be realized as a threshold workload score, where the estimated aggregate workload score calculated as a weighted sum of the different types of database records associated with the jobs allocated to a particular chunk is maintained at or below the threshold workload score, such that the estimated amount of computing resources required for execution of the subset of jobs belonging to a particular chunk is substantially equal across the chunks and maintained below a threshold.

The data stream processing service 160 (or a processing thread associated therewith) selects or otherwise obtains, from the message queue 152, a respective message that includes a subset of the batch of jobs that were allocated to a particular chunk and then executes or otherwise performs the jobs associated with that chunk in parallel to other instances of the data stream processing service 160 processing other chunks obtained from the message queue 152. In this regard, in practice, multiple different instances of the application server 104, the processing system 120 and/or the data stream processing service 160 may exist, such that each instance of the data stream processing service 160 obtains a chunked subset of jobs from the message queue 152 that satisfy the chunking threshold(s) and executes or otherwise performs the obtained subset of jobs asynchronously and in parallel to other instances of the data stream processing service 160 obtaining other mutually exclusive subsets of jobs from the message queue 152 that satisfy the chunking threshold(s) and executing those jobs. In this manner, the chunking service 150 effectively divides the batch of jobs into different mutually exclusive chunks maintained in the message queue 152 substantially in real-time in accordance with the chunking threshold(s) which are configurable to achieve a substantially balanced distribution of workload or computing resource requirements across the different instances of the data stream processing service 160, while the different instances of the data stream processing service 160 asynchronously process the different chunks of jobs allocated by the chunking service 150 in parallel with one another. In one or more implementations, the message queue 152 is implemented or realized as a first in, first out (FIFO) buffer that maintains messages corresponding to chunked subsets of jobs representing work to be performed at the database system 102 in a substantially sequential manner (e.g., by generally performing older jobs before more recent jobs). That said, the subject matter described herein is not limited to sequential processing or FIFO buffers, and may be implemented in an equivalent manner using any sort of priority-based processing or other processing schemes or techniques to process or execute mutually exclusive chunks in any sort of order.

Figure 2:
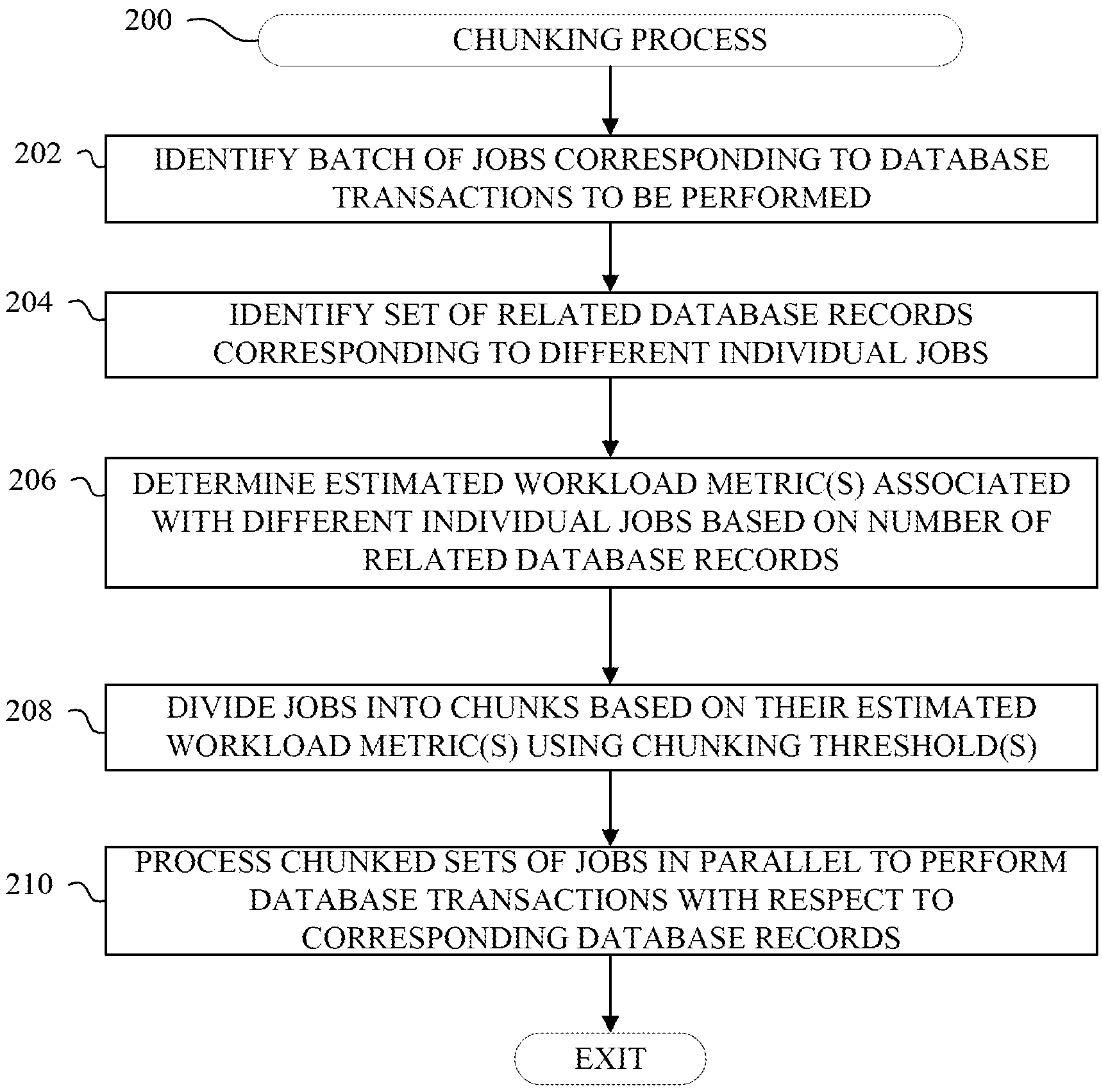
FIG. 2 is a flow diagram illustrating a chunking process suitable for implementation in connection with the chunking service in the computing system of FIG. 1 according to some example implementations.

FIG. 2 depicts an exemplary chunking process 200 suitable for implementation by a chunking service (e.g., chunking service 150) in connection with a data stream processing service (e.g., data stream processing service 160) to support parallel processing of jobs representing heterogenous work related to different records maintained at a database system and perform additional tasks, functions, and/or operations described herein. For illustrative purposes, the following description may refer to elements mentioned above in connection with FIG. 1. It should be appreciated that the chunking process 200 may include any number of additional or alternative tasks, the tasks need not be performed in the illustrated order and/or the tasks may be performed concurrently, and/or the chunking process 200 may be incorporated into a more comprehensive procedure or process having additional functionality not described in detail herein. Moreover, one or more of the tasks shown and described in the context of FIG. 2 could be omitted from a practical implementation of the chunking process 200 as long as the intended overall functionality remains intact.

Referring to FIG. 2 with continued reference to FIG. 1, in exemplary implementations, the chunking process 200 is performed to allocate jobs to different mutually exclusive subsets based on the different record relationships associated with the different jobs to achieve an effectively balanced distribution of workload and computing resource requirements across different chunks, even when the jobs represent heterogenous work involving different CRUD operations or other tasks (or sub-tasks) associated with different database object types and/or different numbers of different database records. In some implementations, the chunking process 200 is implemented in a distributed manner, where different instances of a chunking service 150 implemented at different servers 104 and/or different processing systems 120 asynchronously identify and allocate chunks for processing and adds the chunks to a common or shared message queue 152, where different instances of the data stream processing service 160 implemented at different servers 104 and/or different processing systems 120 asynchronously obtain chunks from the message queue 152 for processing in parallel with, and asynchronously to, other chunks being processed by other instances of the data stream processing service 160.

The chunking process 200 initializes or otherwise begins by identifying or obtaining a batch of jobs corresponding to one or more different CRUD operations or other database transactions to be performed with respect to one or more database records at a database system and then analyzing the respective jobs of the batch to identify a respective set of database records corresponding to each respective job in the batch (tasks 202, 204). For example, in one or more implementations, for each job that is triggered, initiated or otherwise requested by an instance of a virtual application 140, the virtual application 140 generates or otherwise constructs a corresponding job record (or file) that includes data, code or other information necessary for performing the job and provides the job record (or file) to the chunking service 150 for chunking. In this regard, in some implementations, the virtual application 140 may generate or otherwise create a task record associated with a respective job that includes data, code or other information necessary for performing the job at the database system 102 along with a relationship identifier field or other record relationship metadata that identifies the set of database records 114 that are associated with that particular job. The virtual application 140 then generates a corresponding job (which could be realized as any sort of file, message, JSON data, or the like) that includes the task record associated with the respective job to be performed along with any other data, code or other information necessary for executing the job at the database system 102. In this regard, in some implementations, the job file may also include the value for the relationship identifier field or other record relationship metadata for the database records 114 associated with the job that can be utilized to identify related database records 114 without first having to query or otherwise retrieve the record relationship metadata from the database 106.

The chunking service 150 analyzes the individual jobs of the batch of jobs to be performed, and for each individual job, identifies the number and type of different related database records 114 that are associated with that particular job that may be subject to one or more CRUD operations or other database transactions in connection with the job. In this regard, the chunking service 150 utilizes the record relationship metadata associated with an individual job to identify, from within the different data tables 112 in the database 106, a set of different database records 114 associated with that relationship and a corresponding database object type associated with the respective database records 114 in the set of related database records associated with the job.

Still referring to FIG. 2, the chunking process 200 continues by calculating or otherwise determining values for one or more estimated workload metric(s) associated with the different individual jobs based on the number of related database records associated with the respective job (task 206). The estimated workload metric(s) represents or is otherwise correlative to the amount of computing resources required to perform the tasks, sub-tasks or other work associated with the respective job. In some implementations, the estimated workload metric is realized as the total number of related database records associated with the respective job. In other implementations, the estimated workload metric may be realized as a weighted sum of the numbers of different types of database records associated with the respective job. In this regard, it should be appreciated that the subject matter described herein is not limited to any particular type, number or combination of estimated workload metrics that may be calculated, determined or otherwise assigned to an individual job.

Figure 3:
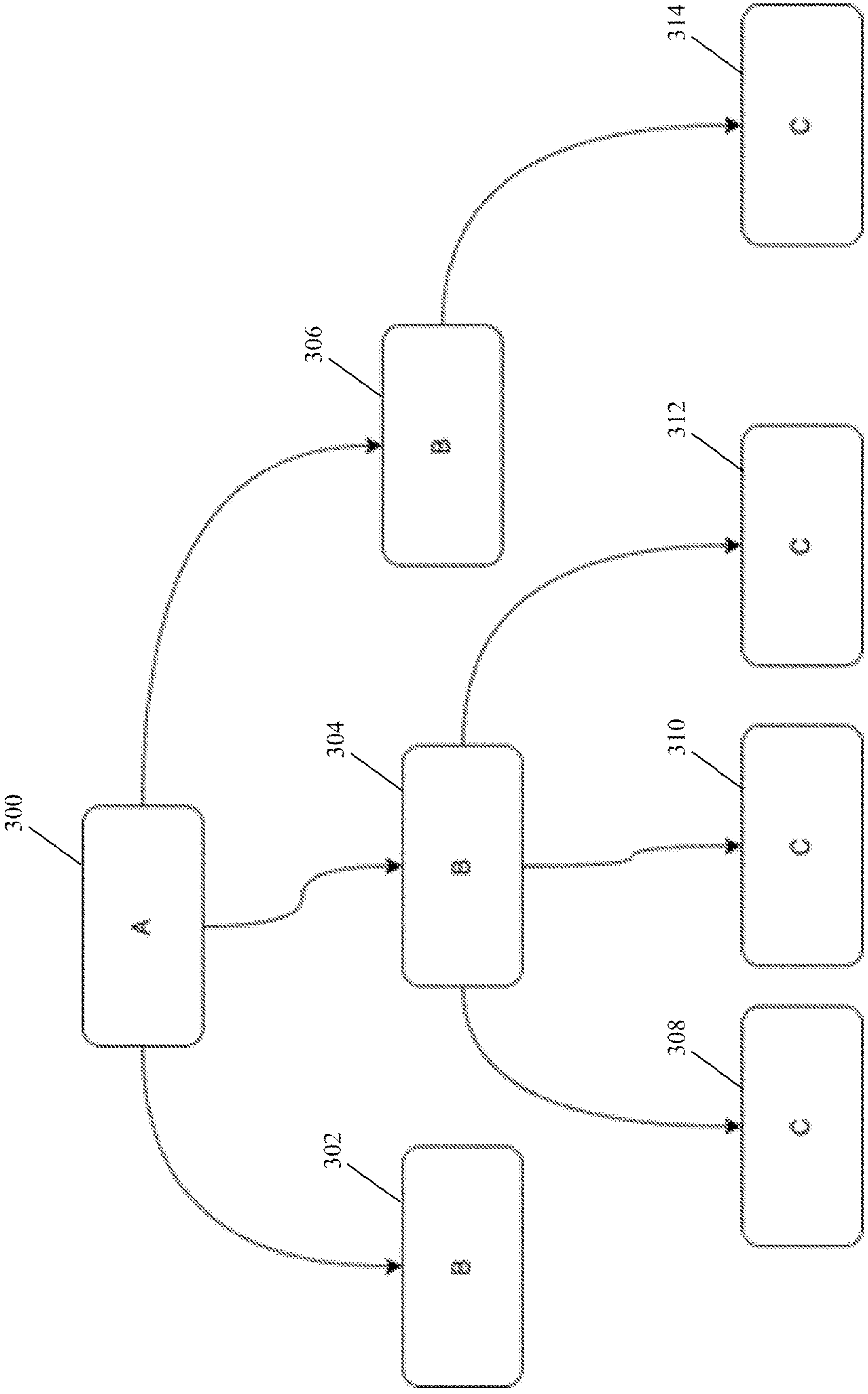
FIG. 3 depicts an exemplary hierarchical relationship between a set of related database records associated with a job in connection with the chunking process of FIG. 2 according to some exemplary implementations.

FIG. 3 depicts an exemplary hierarchical relationship between related database records that may be associated with a particular job that represents heterogeneous work. In this regard, the primary task associated with the job may involve one or more CRUD operations or other database transactions associated with a primary database record 300 having a first database object type (e.g., a type "A" database record), while sub-tasks associated with the job may involve one or more additional CRUD operations or database transactions associated with related database records 302, 304, 306 having a different database object type (e.g., a type "B" database record) but associated with the primary database record 300 in a parent-child relationship to reflect the operations performed with respect to the primary database record 300, for example, updating field values for one or more fields of the related database records 302, 304, 306 to reflect current or updated field values for one or more fields of the primary database record 300. Moreover, one or more of the related child database records 304, 306 may have its own child database records 308, 310, 312, 314 having a different database object type (e.g., a type "C" database record) that entail one or more sub-tasks for one or more CRUD operations or database transactions with respect to those child database records 308, 310, 312, 314 (which are effectively grandchildren of the primary database record 300) to reflect the operations performed with respect to their respective parent database records 304, 306. Upon creation of a task record or other file for a job to be performed with respect to the primary database record 300, a relationship identification field associated with each of the database records 300, 302, 304, 306, 308, 310, 312, 314 may be updated or otherwise set to a value that uniquely identifies the set of related database records 300, 302, 304, 306, 308, 310, 312, 314 associated with that task record or job file.

In some implementations, to calculate an estimated workload metric for a job associated with the primary database record 300, the chunking process 200 utilizes the value for the relationship identification field associated with the task database record to identify the set of related database records 300, 302, 304, 306, 308, 310, 312, 314 associated with that job and then calculates the total number of related database records 300, 302, 304, 306, 308, 310, 312, 314 associated with the job (e.g., 8 total records). In other implementations, after identifying the set of related database records 300, 302, 304, 306, 308, 310, 312, 314, the chunking process 200 calculates or otherwise determines the estimated workload metric for the job as a weighted sum of the different types of database records associated with the job, where each type of database record may be assigned a weighting factor commensurate with the expected amount of computing resources required to process the respective type of database record. For example, the type A database record (e.g., an invoice record or database object type) may be assigned a weighting factor of 3, the type B database record (e.g., a billing schedule record or database object type) may be assigned a weighting factor of 2, and the type C database record (e.g., a billing period transaction record or database object type) may be assigned a weighting factor of 1, resulting in an estimated workload metric value of 13 for the job associated with the primary database record 300. In this regard, it should be appreciated that the subject matter described herein is not limited to any particular values or combinations of weighting factors that may be utilized to assign estimated workload metrics to different sets of related database records.

Referring again to FIG. 2, after determining estimated workload metric values for the respective jobs in the batch of currently available jobs, the chunking process 200 divides or otherwise allocates the batch of currently available jobs into different mutually exclusive subsets (or chunks) of jobs based on their respective values for the estimated workload metric(s) using one or more chunking threshold(s) (task 208). In this regard, the chunking service 150 constructing messages for the message queue 152 may select or otherwise obtain a subset of jobs from the virtual application(s) 140 until an aggregated estimated workload metric value associated with the selected subset of jobs exceeds a corresponding chunking threshold that delineates the allocated amount of computing resources per chunk. In this manner, the batch of jobs from the virtual application(s) 140 are divided into multiple mutually exclusive chunks of jobs in the message queue 152, where the aggregated estimated workload metric associated with a respective chunk is maintained less than or equal to a chunking threshold, thereby providing a substantially balanced distribution of computing resource consumption across the different chunks.

FIG. 4 depicts a table of an exemplary batch of jobs, where each job is associated with a unique relationship identification field value that uniquely identifies the respective set of related type A, type B and type C database records that are associated with the respective job. In one or more implementations, the batch of jobs is chunked based on the relationship identification field value to preserve the relationship of related database records. For example, if the chunking threshold were set to a value of a maximum chunk size of 3 sets of related records per chunk, the jobs associated with RelationshipID1, RelationshipID2 and RelationshipID3 may be assigned to a first chunk, while the jobs associated with RelationshipID4 and RelationshipID5 are assigned to a second chunk to be asynchronously processed in parallel with the first chunk. For processing each chunk, inside a message handler, the set of related records associated with the respective relationship identification field value for a respective job are fetched before performing the appropriate operations defined by the task(s) associated with the respective job and then updating and committing the result to the database 106 before executing the next job. Since the related sets of database records are selected and chunked on the basis of the record relationship identification field, related database records will not be allocated to different chunks, thereby achieving atomic updates for all related database records associated with a particular job.

In other implementations, to account for the variations in the amount of computing resources that may be required per set of related database records, since the number and type of database records belonging to the set may vary the amount and complexity of the sub-tasks associated with a job, in other implementations, the batch of jobs is chunked based on total number of related database records associated with each relationship identification field value. For example, if the chunking threshold were set to a value of a maximum chunk size of 20 related records per chunk, the jobs associated with RelationshipID1 and RelationshipID2 may be assigned to a first chunk (having a total number of 20 related database records), while the job associated with RelationshipID3 (having a total number of 20 related database records) is assigned to a second chunk to be asynchronously processed in parallel with the first chunk, and the jobs associated with RelationshipID4 and RelationshipID5 are assigned to a third chunk to be asynchronously processed in parallel with the first and second chunks. In this regard, since the total number of 15 related records associated with the third chunk is less than the chunking threshold value of 20, a subsequent job having an associated relationship identification field value with 5 or fewer related database records may be assigned to the third chunk prior to processing.

In other implementations, weighting factors may be employed to further account for the heterogeneity and variations in the amount of computing resources that may be required per set of related database records. For example, the type A database record may be assigned a weighting factor of 3, the type B database record may be assigned a weighting factor of 2, and the type C database record may be assigned a weighting factor of 1, resulting in an estimated workload score of 23 for RelationshipID1, 8 for RelationshipID2, 27 for RelationshipID3, 23 for RelationshipID4, and 9 for RelationshipID5. If the chunking threshold were set to a value of a maximum estimated workload score of 30 per chunk, RelationshipID1, RelationshipID3 and RelationshipID4 may be assigned to different chunks, while RelationshipID2 and RelationshipID5 may be assigned to a common chunk to be asynchronously processed in parallel with the other three chunks. In this regard, since the estimated workload scores of the different chunks are less than the chunking threshold value of 30, a subsequent job may be assigned to one of the chunks to bring the aggregated estimated workload score to a total value of 30 before processing the respective chunk. For example, if a job associated with RelationshipID6 were to have an estimated workload score of 3 (e.g., one type A record and zero type B or type C records), the job associated with RelationshipID6 may be assigned to the same chunk as RelationshipID3 to bring the aggregated estimated workload score of that chunk to 30. Alternatively, if the job associated with RelationshipID6 were to have an estimated workload score between 4 and 7, the job associated with RelationshipID6 may be assigned to the same chunk as either RelationshipID1 or RelationshipID3, while an estimated workload score between 8 and 13 could be assigned to the same chunk as RelationshipID2 and RelationshipID5. In this manner, the chunking process 200 supports distributing composite units of work across different servers or processing units in a manner that substantially balances computing resource usage while facilitating parallel processing and maintaining the integrity of the relationships between related database records and atomicity of their associate operations.

Referring again to FIG. 2, after dividing the jobs into different mutually exclusive chunks based on the record relationships associated with the respective jobs, the chunking process 200 continues by processing or otherwise executing the different mutually exclusive chunked sets of jobs in parallel to asynchronously perform corresponding CRUD operations or other database transactions on corresponding database records (task 210). In this regard, different instances of the data stream processing service 160 (or processing threads associated therewith) that are not currently processing or executing a chunk of jobs may continually monitor or otherwise listen to the message queue 152 for a message containing a chunked batch of jobs ready for processing. In other implementations, the chunking service 150 may make an API call to the data stream processing service 160 to request processing of a new chunk of jobs or otherwise notify the data stream processing service 160 that a new chunk of jobs is available. When a new message corresponding to a chunk of jobs is available, the data stream processing service 160 automatically and asynchronously retrieves or otherwise obtains the message from the message queue 152, and then automatically and asynchronously begins executing or otherwise performing the jobs contained within that respective chunk of jobs, for example, by performing a CRUD operation on a primary database record 114 associated with a job while locking related database records 114 associated with that primary database record 114 and/or record relationship identification field value. In connection with the CRUD operation on the primary database record 114, the data stream processing service 160 may also execute or otherwise perform any associated sub-tasks for related CRUD operations on the set of related database records 114 before committing the results to the database 106, and then releasing or unlocking the set of related database records 114 after the job has been completed. In this regard, a locked database record is accessible to whatever actor is processing the job in connection with the current processing transaction has exclusive edit access to that record, while attempts to access the locked database record by other actors or processing transactions would result in failure or inability to edit or access the respective record.

By virtue of any jobs associated with a set of related database records 114 being allocated to a common chunk that is mutually exclusive from other chunks, the locking of the related set of database records 114 by one data stream processing service 160 maintains atomicity of the CRUD operations or database transactions with respect to the related set of database records 114 without interfering with parallel processing of other chunks by other instances of the data stream processing service 160. In this regard, while one instance of a data stream processing service 160 (or processing thread associated therewith) is busy processing one chunk of jobs, other instances of the data stream processing service 160 (or processing threads associated therewith) that are not currently processing or executing a chunk of jobs continue to monitor or listen to the message queue 152 for a message containing a chunked batch of jobs ready for processing. When a new message corresponding to another chunk of jobs is available, one of the other instances of the data stream processing service 160 automatically and asynchronously retrieves or otherwise obtains the message from the message queue 152, and then automatically and asynchronously begins executing or otherwise performing the jobs contained within that respective chunk of jobs in parallel to the preceding chunk of jobs that is already in process of being performed by another instance of the data stream processing service 160. Once an instance of a data stream processing service 160 finishes execution of a chunk of jobs, that instance of the data stream processing service 160 may revert to monitoring the message queue 152 or otherwise listening for a new chunk of jobs to be processed.

Still referring to FIG. 2, it should be noted that the chunking process 200 may be continually repeated such that the chunking service 150 continually obtains and batches jobs from instances of the virtual application 140 in real-time and dynamically allocates or otherwise divides jobs into different mutually exclusive chunks using the record relationship metadata associated with the respective jobs, while the data stream processing service 160 continues to asynchronously retrieve and process chunks of jobs from the message queue 152 to efficiently perform the corresponding database transactions at the database 106. In this manner, the different chunks of jobs added to the message queue 152 by the chunking service 150 may be continually processed and executed asynchronously and in parallel with one another to achieve a substantially balanced distribution of work across the different instances of the data stream processing service 160 that results in efficient performance of the jobs initiated by the virtual application(s) 140 while maintaining atomicity across related sets of database records 114 and reducing the total amount of time required to process the jobs (as compared to conventional serial processing).

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
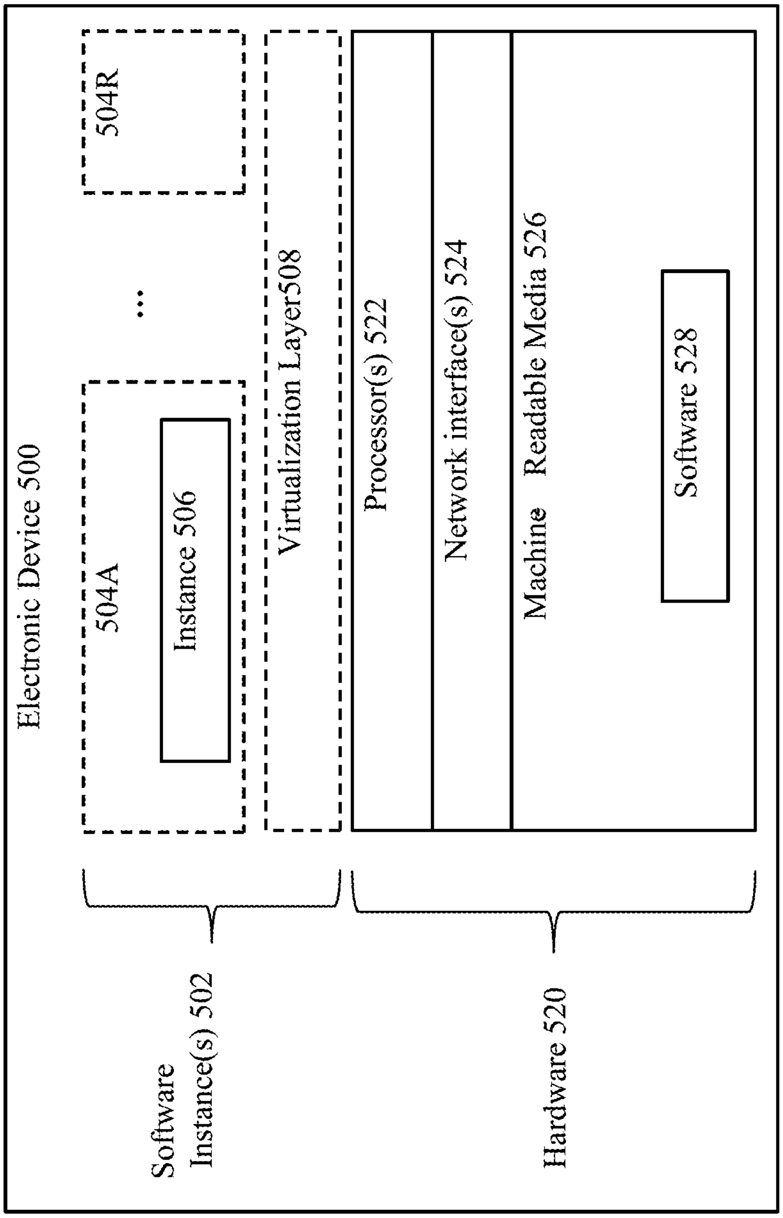
FIG. 5A is a block diagram illustrating an electronic device according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable media. Each of the previously described clients, chunking services and data stream processing services may be implemented in one or more electronic devices 500. In one implementation: 1) each of the clients is implemented in a separate one of the electronic devices 500 (e.g., in end user devices where the software 528 represents the software to implement clients to interface directly and/or indirectly with the chunking service and/or data stream processing service (e.g., software 528 represents a web browser, a native client, a portal, a command-line interface, and/or an application programming interface (API) based upon protocols such as Simple Object Access Protocol (SOAP), Representational State Transfer (REST), etc.)); 2) the chunking service and/or data stream processing service is implemented in a separate set of one or more of the electronic devices 500 (e.g., a set of one or more server devices where the software 528 represents the software to implement the chunking service and/or data stream processing service); and 3) in operation, the electronic devices implementing the clients and the chunking service and/or data stream processing service would be communicatively coupled (e.g., by a network) and would establish between them (or through one or more other layers and/or or other services) connections for submitting requests to the chunking service and/or data stream processing service. Other configurations of electronic devices may be used in other implementations (e.g., an implementation in which the client and the chunking service and/or data stream processing service are implemented on a single one of electronic device 500).

During operation, an instance of the software 528 (illustrated as instance 506 and referred to as a software instance; and in the more specific case of an application, as an application instance) is executed. In electronic devices that use compute virtualization, the set of one or more processor (s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative implementations of an electronic device may have numerous variations from that described above. For example, customized hardware and/or accelerators might also be used in an electronic device.

Figure 5B:
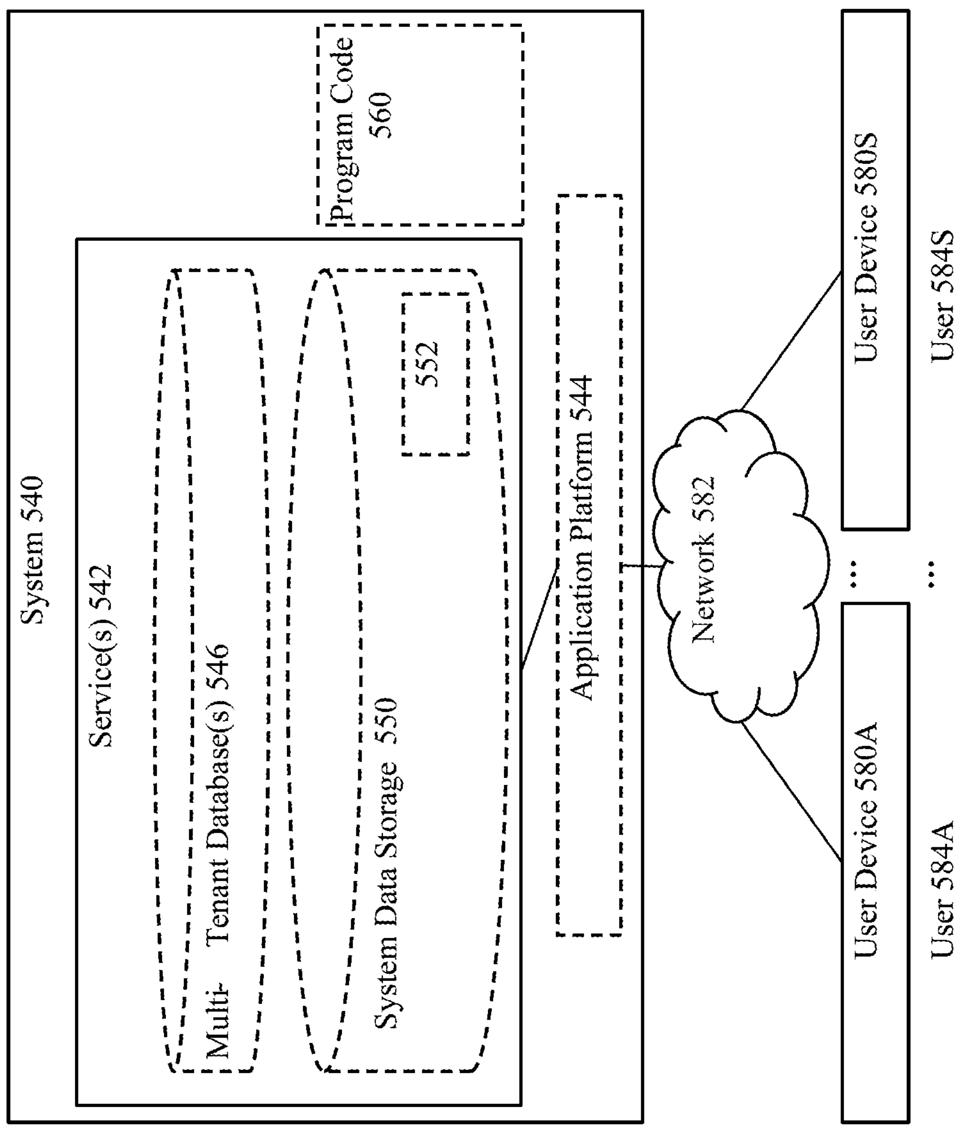
FIG. 5B is a block diagram of a deployment environment according to some example implementations.

FIG. 5B is a block diagram of a deployment environment according to some example implementations. A system 540 includes hardware (e.g., a set of one or more server devices) and software to provide service(s) 542, including a chunking service and/or a data stream processing service. In some implementations the system 540 is in one or more datacenter (s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 540 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the chunking service and/or the data stream processing service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of parallel processing a batch of jobs at a database system including a server and a database, wherein each respective database record of a first set of database records in the database corresponds to a respective job of the batch of jobs, and respective jobs of the batch of jobs are associated with a respective set of related database records based on a respective value for a metadata field of the respective database record corresponding to the respective job, wherein the respective value for the metadata field uniquely identifies the respective set of related database records associated with the respective database record, the method comprising:

dividing, by the server, the batch of jobs into a plurality of chunks based on respective sets of related database records associated with respective jobs of the batch of jobs, wherein each chunk of the plurality of chunks includes a respective subset of the batch of jobs having an aggregate workload based on the respective sets of related database records associated with the respective jobs of the respective chunk that is less than a chunking threshold; and asynchronously parallel processing, by the server at the database system, the plurality of chunks to perform corresponding operations on corresponding database records in the database.

2. The method of claim 1, wherein:

the chunking threshold comprises a threshold number of related sets of database records per chunk; and dividing the batch of jobs comprises allocating, to each chunk of the plurality of chunks, the respective subset of the batch of jobs having a total number of the respective sets of related database records associated with the respective subset of jobs that is less than or equal to the threshold number of related sets of database records per chunk.

3. The method of claim 1, wherein:

the chunking threshold comprises a threshold number of database records per chunk; and dividing the batch of jobs comprises:

determining, for the respective jobs of the batch of jobs, a respective number of related database records associated with the respective job based on the respective database record corresponding to the respective job and the respective set of related database records associated with the respective job; and allocating, to a respective chunk of the plurality of chunks, a plurality of jobs of the batch of jobs, wherein a sum of the respective number of related database records associated with the respective job of the plurality of jobs results in a total number of related database records associated with the plurality of jobs that is less than or equal to the threshold number of database records per chunk.

4. The method of claim 1, wherein:

the chunking threshold comprises a threshold workload score per chunk; and dividing the batch of jobs comprises:

determining, for the respective jobs of the batch of jobs, a respective number of related database records associated with the respective job based on the respective database record corresponding to the respective job and the respective set of related database records associated with the respective job;

determining, for the respective jobs of the batch of jobs, a respective workload score associated with the respective job based at least in part on the respective number of related database records associated with the respective job and one or more weighting factors; and allocating, to a respective chunk of the plurality of chunks, a plurality of jobs of the batch of jobs, wherein a sum of the respective workload scores associated with the respective job of the plurality of jobs results in an aggregate workload score associated with the plurality of jobs that is less than or equal to the threshold workload score per chunk.

5. The method of claim 4, wherein determining the respective workload score comprises calculating the respective workload score as a weighted sum of respective numbers of different types of database records associated with the respective job.

6. The method of claim 1, wherein processing the plurality of chunks in parallel comprises one or more data stream processing services at the database system asynchronously selecting a respective chunk of the plurality of chunks and asynchronously performing jobs of the respective subset of jobs allocated to the respective chunk.

7. The method of claim 6, further comprising:

generating, for each chunk of the plurality of chunks, a respective message including information identifying the respective subset of the batch of jobs included in the respective chunk; and adding the respective message to a message queue, wherein the one or more data stream processing services at the database system asynchronously select the respective chunk from the message queue.

8. The method of claim 6, wherein asynchronously performing jobs of the respective subset of jobs allocated to the respective chunk comprises the one or more data stream processing services locking the respective set of related database records associated with the respective job while performing the respective job.

9. At least one non-transitory machine-readable storage medium that provides instructions that, when executed by at least one processor, are configurable to cause the at least one processor to perform operations comprising:

identifying a first set of database records at the database system corresponding to the batch of jobs, wherein each respective database record of the first set of database records corresponds to a respective job of the batch of jobs;

identifying, for the respective jobs of the batch of jobs, a respective set of related database records associated with the respective job based on a respective value for a metadata field of the respective database record corresponding to the respective job, wherein the respective value for the metadata field uniquely identifies the respective set of related database records associated with the respective database record;

dividing the batch of jobs into a plurality of chunks based on respective sets of related database records associated with respective jobs of the batch of jobs, wherein each chunk of the plurality of chunks includes a respective subset of the batch of jobs having an aggregate workload based on the respective sets of related database records associated with the respective jobs of the respective chunk that is less than a chunking threshold; and processing, at the database system, the plurality of chunks in parallel.

10. The at least one non-transitory machine-readable storage medium of claim 9, wherein:

the chunking threshold comprises a threshold number of related sets of database records per chunk; and the instructions are configurable to cause the at least one processor to divide the batch of jobs by allocating, to each chunk of the plurality of chunks, the respective subset of the batch of jobs having a total number of the respective sets of related database records associated with the respective subset of jobs that is less than or equal to the threshold number of related sets of database records per chunk.

11. The at least one non-transitory machine-readable storage medium of claim 9, wherein:

the chunking threshold comprises a threshold number of database records per chunk; and the instructions are configurable to cause the at least one processor to divide the batch of jobs by:

determining, for the respective jobs of the batch of jobs, a respective number of related database records associated with the respective job based on the respective database record corresponding to the respective job and the respective set of related database records associated with the respective job; and allocating, to a respective chunk of the plurality of chunks, a plurality of jobs of the batch of jobs, wherein a sum of the respective number of related database records associated with the respective job of the plurality of jobs results in a total number of related database records associated with the plurality of jobs that is less than or equal to the threshold number of database records per chunk.

12. The at least one non-transitory machine-readable storage medium of claim 9, wherein:

the chunking threshold comprises a threshold workload score per chunk; and the instructions are configurable to cause the at least one processor to divide the batch of jobs by:

determining, for the respective jobs of the batch of jobs, a respective number of related database records associated with the respective job based on the respective database record corresponding to the respective job and the respective set of related database records associated with the respective job;

determining, for the respective jobs of the batch of jobs, a respective workload score associated with the respective job based at least in part on the respective number of related database records associated with the respective job and one or more weighting factors; and allocating, to a respective chunk of the plurality of chunks, a plurality of jobs of the batch of jobs, wherein a sum of the respective workload scores associated with the respective job of the plurality of jobs results in an aggregate workload score associated with the plurality of jobs that is less than or equal to the threshold workload score per chunk.

13. The at least one non-transitory machine-readable storage medium of claim 12, wherein the instructions are configurable to cause the at least one processor to determine the respective workload score by calculating the respective workload score as a weighted sum of respective numbers of different types of database records associated with the respective job.

14. The at least one non-transitory machine-readable storage medium of claim 9, wherein the instructions are configurable to cause the at least one processor to process the plurality of chunks in parallel by asynchronously selecting a respective chunk of the plurality of chunks and asynchronously performing jobs of the respective subset of jobs allocated to the respective chunk.

15. The at least one non-transitory machine-readable storage medium of claim 14, wherein the instructions are configurable to cause the at least one processor to:

generate, for each chunk of the plurality of chunks, a respective message including information identifying the respective subset of the batch of jobs included in the respective chunk; and add the respective message to a message queue, wherein one or more data stream processing services at the database system asynchronously select the respective chunk from the message queue.

16. The at least one non-transitory machine-readable storage medium of claim 14, wherein the instructions are configurable to cause the at least one processor to lock the respective set of related database records associated with the respective job while performing the respective job of the respective subset of jobs allocated to the respective chunk.

17. A computing device comprising:

at least one non-transitory machine-readable storage medium that stores software; and at least one processor, coupled to the at least one non-transitory machine-readable storage medium, to execute the software that implements a chunking service and that is configurable to:

identify a first set of database records at the database system corresponding to the batch of jobs, wherein each respective database record of the first set of database records corresponds to a respective job of the batch of jobs;

identify, for the respective jobs of the batch of jobs, a respective set of related database records associated with the respective job based on a respective value for a metadata field of the respective database record corresponding to the respective job, wherein the respective value for the metadata field uniquely identifies the respective set of related database records associated with the respective database record;

divide the batch of jobs into a plurality of chunks based on respective sets of related database records associated with respective jobs of the batch of jobs, wherein each chunk of the plurality of chunks includes a respective subset of the batch of jobs having an aggregate workload based on the respective sets of related database records associated with the respective jobs of the respective chunk that is less than a chunking threshold; and process, at the database system, the plurality of chunks in parallel.

18. The computing device of claim 17, wherein the at least one processor executes the software to implement a data stream processing service that is configurable to asynchronously process respective chunks of the plurality of chunks in parallel.

19. The computing device of claim 17, wherein the chunking threshold comprises a threshold number of database records per chunk.

20. The computing device of claim 17, wherein the chunking threshold comprises a threshold workload score per chunk, wherein the chunking service is configurable to:

determine, for the respective jobs of the batch of jobs, a respective number of related database records associated with the respective job based on the respective database record corresponding to the respective job and the respective set of related database records associated with the respective job;

determine, for the respective jobs of the batch of jobs, a respective workload score associated with the respective job based at least in part on the respective number of related database records associated with the respective job and one or more weighting factors; and allocate, to a respective chunk of the plurality of chunks, a plurality of jobs of the batch of jobs, wherein a sum of the respective workload scores associated with the respective job of the plurality of jobs results in an aggregate workload score associated with the plurality of jobs that is less than or equal to the threshold workload score per chunk.

* * * * *